United States Patent
Wu

(10) Patent No.: US 11,375,403 B2
(45) Date of Patent: Jun. 28, 2022

(54) METHOD AND APPARATUS FOR DETECTING MAXIMUM TRANSMISSION UNIT VALUE

(71) Applicant: BEIJING XIAOMI MOBILE SOFTWARE CO., LTD., Beijing (CN)

(72) Inventor: Zhe Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/146,244

(22) Filed: Jan. 11, 2021

(65) Prior Publication Data

US 2021/0377798 A1 Dec. 2, 2021

(30) Foreign Application Priority Data

May 28, 2020 (CN) .......................... 202010481915.4

(51) Int. Cl.
*H04W 28/06* (2009.01)
*H04L 47/36* (2022.01)

(52) U.S. Cl.
CPC ......... *H04W 28/065* (2013.01); *H04L 47/365* (2013.01)

(58) Field of Classification Search
None
See application file for complete search history.

(56) References Cited

U.S. PATENT DOCUMENTS

| 2004/0071140 A1* | 4/2004 | Jason | H04L 69/24 370/392 |
| 2019/0268276 A1* | 8/2019 | Lee | H04L 47/36 |
| 2019/0313285 A1* | 10/2019 | Gottwerth | H04W 76/12 |
| 2021/0051112 A1* | 2/2021 | Wondra | H04L 12/4641 |

FOREIGN PATENT DOCUMENTS

| CN | 107404705 A | 11/2017 |
| CN | 109873763 A | 6/2019 |
| EP | 2608599 A1 | 6/2013 |

OTHER PUBLICATIONS

Extended European Search Report for EP Application No. 21155789.7 dated Jul. 27, 2021, (11p).

* cited by examiner

*Primary Examiner* — Diane L Lo
(74) *Attorney, Agent, or Firm* — Arch & Lake LLP

(57) ABSTRACT

The present disclosure relates to a method and an apparatus for detecting a maximum transmission unit (MTU) value. The data sender forms a first detection packet according to a first preset rule based on its MTU value. The data sender sends the first detection packet to a data receiver. The data sender receives a second detection packet from the data receiver. The data sender determines an MTU value included in the second detection packet as an MTU value of data transmission between the data sender and the data receiver.

10 Claims, 4 Drawing Sheets

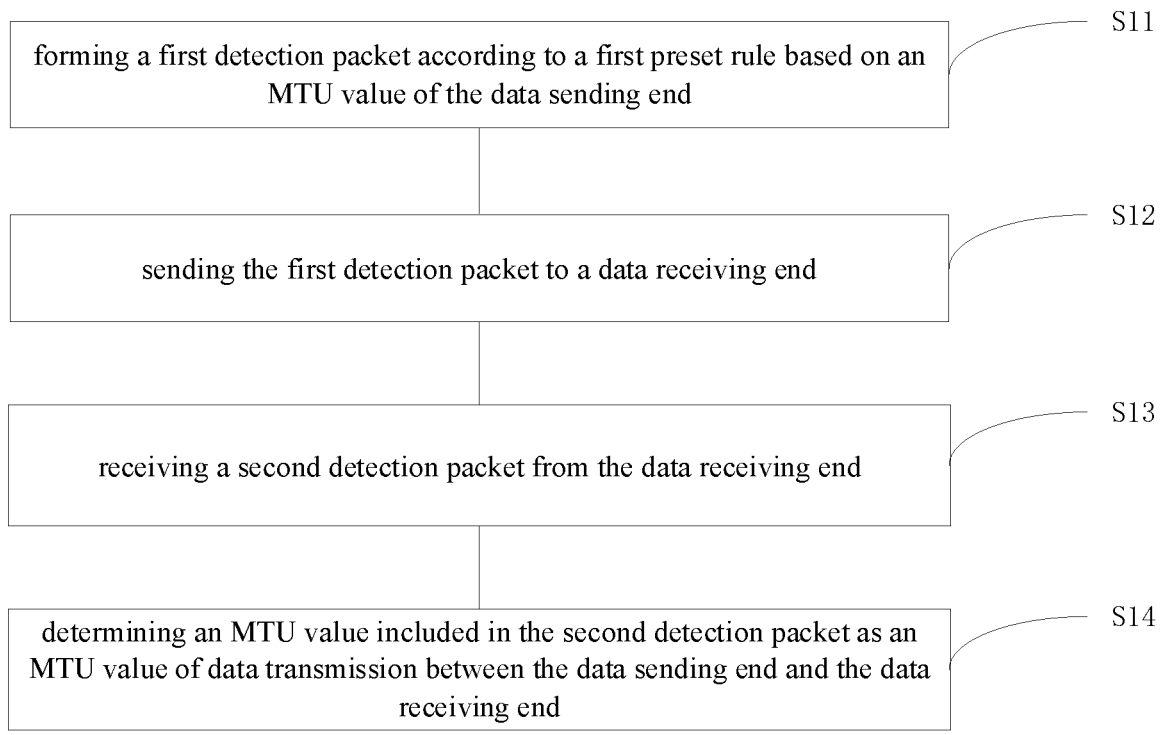
FIG. 1
| 1 | 2 | 3 | ...... | 20 | 21 | ...... | 80 |
|---|---|---|---|---|---|---|---|
| 80 | X | X | X | X | 0 | 0 | 0 |
FIG. 2
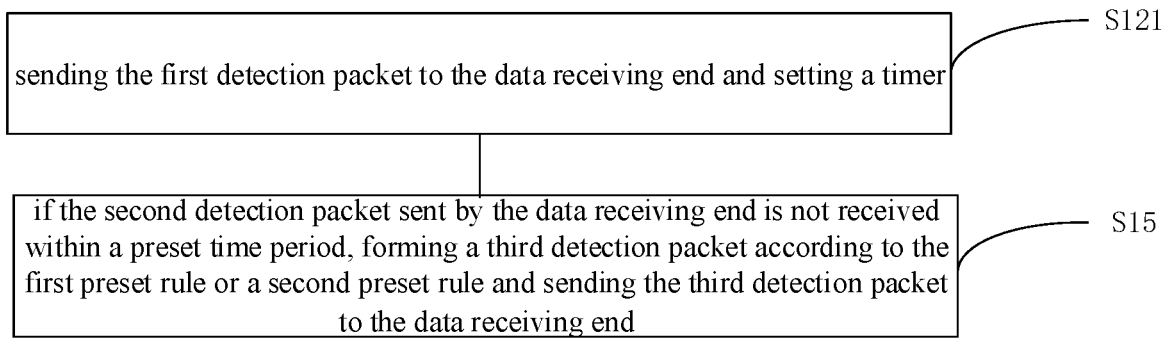
FIG. 3 determining a smaller value between the byte length of the first detection packet and the MTU value of the data receiving end as the MTU value of the data transmission from the data receiving end to the data sending end. — S231

FIG. 7 a byte length of the second detection packet is the same as the content included in each byte of the second detection packet; or the content included in a given byte of the second detection packet is the byte length of the second detection packet — S241

FIG. 8

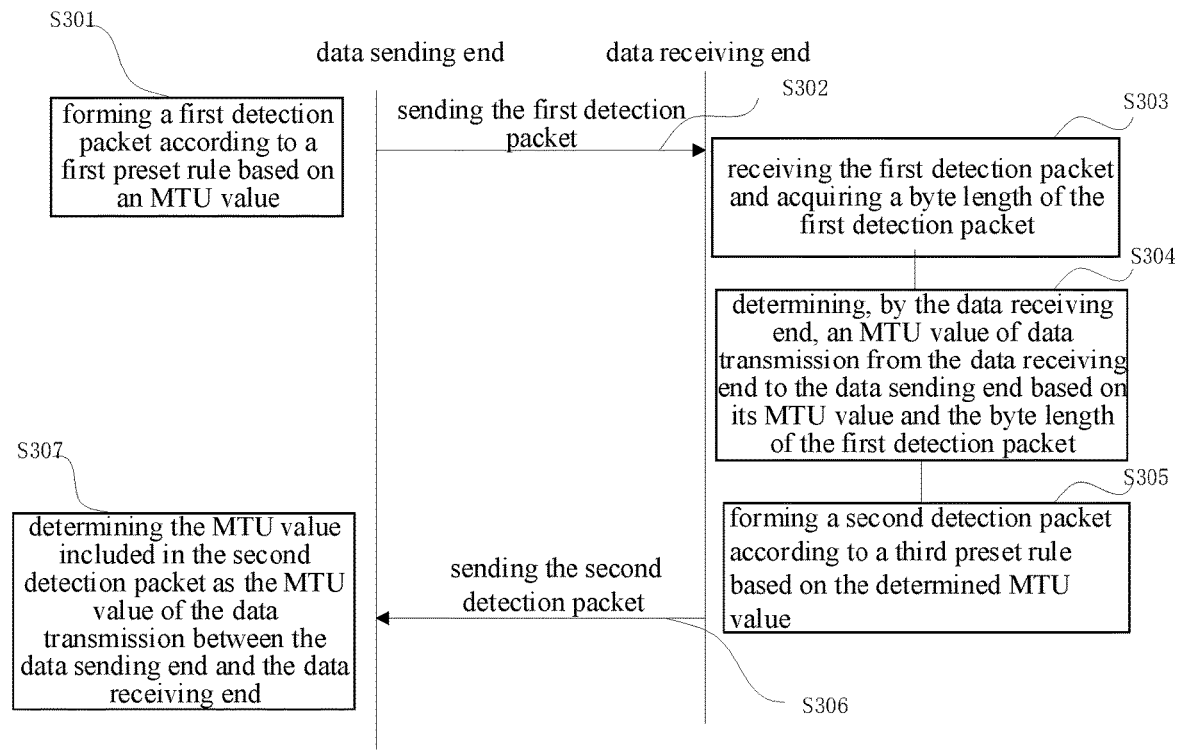

FIG. 9

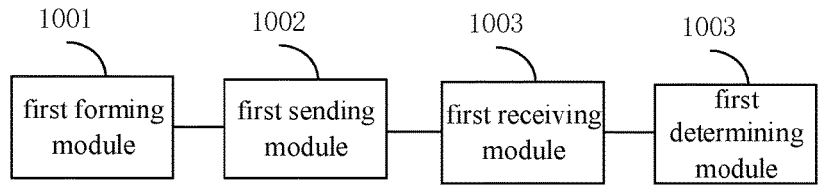

FIG. 10

METHOD AND APPARATUS FOR DETECTING MAXIMUM TRANSMISSION UNIT VALUE

CROSS-REFERENCE TO RELATED APPLICATION

This application is based on and claims priority to Chinese Patent Application Serial No. 202010481915.4, filed on May 28, 2020, the entire contents of which are incorporated herein by reference.

TECHNICAL FIELD

The present disclosure relates to a field of communications, and in particular to a method and an apparatus for detecting a maximum transmission unit (MTU) value, and a storage medium.

BACKGROUND

In the related art, data transmission between different devices becomes more and more frequent, and data required to be transmitted also become larger and larger. For example, Bluetooth BLE (Bluetooth Low Energy) is often used in transmission of voice data between devices, or used in scenarios such as OTA (Over the Air) upgrade of products. In these scenarios, a large amount of file data is required to be transmitted, and thus the data transmission in the Bluetooth BLE is required to be as efficient as possible, thereby reducing time occupation and improving user experience. At present, the maximum transmission unit (MTU) in the data transmission process is determined only based on a simple interaction between a data transmitter and a data receiver. However, for example, due to the compatibility of the Bluetooth protocol with various devices in actual use, packet loss often occurs when the determined MTU value is used for data transmission, or the transmission packet is formed according to a default MTU value of the device, which leads to poor user experience. It is an urgent problem to be solved to provide a detection method for accurately determining the MTU value.

SUMMARY

According to a first aspect of the present disclosure, a method for detecting an MTU value is provided. The method is applied to a data sender or a data sending end, and includes:

forming a first detection packet according to a first preset rule based on an MTU value of the data sender; sending the first detection packet to a data receiver; receiving a second detection packet from the data receiver; and determining an MTU value included in the second detection packet as an MTU value of data transmission between the data sender and the data receiver.

According to a second aspect of the present disclosure, a method for detecting an MTU value is provided. The method is applied to a data receiving end or a data receiver and includes: receiving a first detection packet from a data sender; acquiring a byte length of the first detection packet; determining an MTU value of data transmission from the data receiver to the data sender based on the byte length of the first detection packet and an MTU value of the data receiver; forming a second detection packet according to a third preset rule based on the determined MTU value of the data transmission from the data receiver to the data sender; and sending the second detection packet to the data sender.

According to a third aspect of the present disclosure, an apparatus for detecting an MTU value is provided. The apparatus includes: a processor; and a memory configured to store instructions executable by the processor. The processor is configured to: form a first detection packet according to a first preset rule based on an MTU value of a data sender; send the first detection packet to a data receiver; receive a second detection packet from the data receiver; and determine an MTU value included in the second detection packet as an MTU value of data transmission between the data sender and the data receiver.

According to a fourth aspect of the present disclosure, an apparatus for detecting an MTU is provided. The apparatus includes: a processor; and a memory configured to store instructions executable by the processor. The processor is configured to: receive a first detection packet from a data sender; acquire a byte length of the first detection packet; determine an MTU value of data transmission from the data receiver to the data sender based on the byte length of the first detection packet and an MTU value of the data receiver; form a second detection packet according to a third preset rule based on the determined MTU value of the data transmission from the data receiver to the data sender; and send the second detection packet to the data sender.

According to a fifth aspect of the present disclosure, a non-transitory computer-readable storage medium is provided. When instructions in the storage medium are executed by a processor of a mobile terminal, the mobile terminal is enabled to perform a method for detecting an MTU value, the method including: forming a first detection packet according to a first preset rule based on an MTU value of the data sender; sending the first detection packet to a data receiver; receiving a second detection packet from the data receiver; and determining an MTU value included in the second detection packet as an MTU value of data transmission between the data sender and the data receiver.

According to a sixth aspect of the present disclosure, a non-transitory computer-readable storage medium is provided. When instructions in the storage medium are executed by a processor of a mobile terminal, the mobile terminal is enabled to perform a method for detecting an MTU value, the method including: receiving a first detection packet from a data sender; acquiring a byte length of the first detection packet; determining an MTU value of data transmission from the data receiver to the data sender based on the byte length of the first detection packet and an MTU value of the data receiver; forming a second detection packet according to a third preset rule based on the determined MTU value of the data transmission from the data receiver to the data sender; and sending the second detection packet to the data sender.

It should be understood that the above general description and the following detailed description are only exemplary and explanatory, without any limitation to the present disclosure.

BRIEF DESCRIPTION OF THE DRAWINGS

The drawings herein are incorporated into the specification and constitute a part of the specification, which illustrate the embodiments that conform to the present disclosure and are used to explain the principle of the present disclosure together with the specification.

FIG. 1 is a flowchart of a method for detecting an MTU value illustrated according to an embodiment;

FIG. 2 exemplarily illustrates a structure diagram of a first detection packet;

FIG. 3 illustrates a flowchart of a method for sending the first detection packet to a data receiving end at step S12 in FIG. 1;

FIG. 7 illustrates a flowchart of a method for determining an MTU value of data transmission from the data receiving end to the data sending end based on a byte length of the first detection packet and an MTU value of the data receiving end at step S23 in FIG. 5;

FIG. 8 illustrates a flowchart of forming a second detection packet according to a third preset rule at step S24 in FIG. 5;

FIG. 9 is an example of a method for detecting an MTU value illustrated according to an embodiment;

FIG. 10 is a block diagram of an apparatus for detecting an MTU value illustrated according to an embodiment;

DETAILED DESCRIPTION

Figure 4:
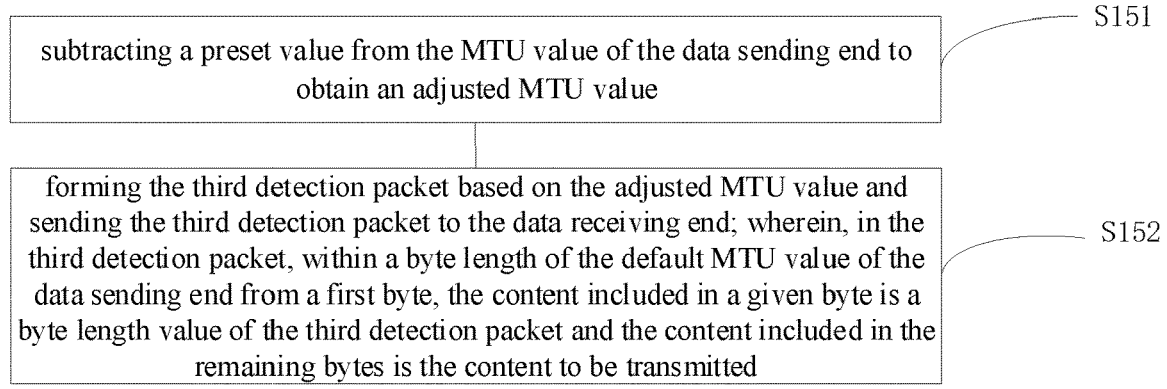
FIG. 4 illustrates a flowchart of a method for forming a third detection packet according to a second preset rule at step S15 in FIG. 2.

Embodiments will be explained in detail here, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with some aspects related to the present disclosure as detailed in the appended claims. The term "module," may also refer to "circuitry," as used herein includes hardware and software to operate the hardware.

Embodiments of the present disclosure provide a method for detecting an MTU value. FIG. 1 is a flowchart of a method for detecting an MTU value illustrated according to an embodiment. The method for detecting the MTU value described in FIG. 1 is applied to a data sender or a data sending end. The data sender or data sending end may include one or more transmitters for sending data to a receiver. As illustrated in FIG. 1, the method for detecting the MTU value includes the following steps.

At step S11, a first detection packet is formed according to a first preset rule based on an MTU value of the data sending end.

At step S12, the first detection packet is sent to a data receiving end.

At step S13, a second detection packet is received from the data receiving end.

At step S14, an MTU value contained in the second detection packet is determined as an MTU value of data transmission between the data sending end and the data receiving end.

In the method for detecting the MTU value provided in the present disclosure, the first detection packet is formed according to the first preset rule based on the MTU value of the data sending end, such as 80 bytes. The first detection packet is sent to the data receiving end, for detecting the MTU value between the data sending end and the data receiving end. The second detection packet from the data receiving end is received and the MTU value contained in the second detection packet is determined as the MTU value of the data transmission between the data sending end and the data receiving end. That is, the MTU value of the data sending end is used as the MTU value of the data transmission between the data sending end and the data receiving end, after the data receiving end notifies the MTU value that can be used by the data receiving end to the data sending end.

In order to improve the efficiency of data transmission and save time during the data transmission between the data sending end and the data receiving end, the MTU value that can be used by the data sending end and the data receiving end may often be determined. For example, when data is transmitted between two electronic devices through Bluetooth or Bluetooth BLE, the MTU value of the data transmission between the two electronic devices may be determined first, so that the two electronic devices may perform the data transmission at maximum efficiency.

In the method for detecting the MTU value provided by the present disclosure, the data sending end firstly forms the first detection packet based on its MTU value and sends the first detection packet to the data receiving end, so that the MTU value that can be used by the data sending end is notified to the data receiving end; and after receiving the second detection packet, determines the MTU value that can be used by the data receiving end and takes the MTU value that can be used by the data receiving end as the MTU value of the data transmission between the data sending end and the data receiving end, thereby effectively improving the accuracy of determining the MTU value of the data transmission between the data sending end and the data receiving end.

In the method for detecting the MTU value provided in the present disclosure, in order to make the detection process of the method for detecting the MTU value not occupy too much time or resources, the first detection packet may be formed according to the first preset rule considering that there is a data loss due to compatibility issues during the detection process and in view of the default MTU value (such as 20 bytes) of the data sending end.

In the first detection packet, within a byte length of the default MTU value of the data sending end from a first byte, content included in a given byte is a byte length value of the first detection packet and content included in the remaining bytes is content to be transmitted.

In the first detection packet, within the byte length of the default MTU value from the first byte (i.e., from the first byte to the 20th byte), the content included in the given byte (such as the first byte) is a byte length value of the first detection packet, with the purpose of informing the data receiving end of the MTU value that can be used by the data sending end. The remaining bytes include the content to be transmitted, so that the content that needs to be transmitted may also be included during the detection process, and the transmission rate is increased to avoid the detection process for the MTU value from occupying too much time or resources. The valid characters are stored in the byte length of the default MTU value of the data sending end, with the purpose of avoiding data loss caused by the system compatibility issues. The data receiving end may receive the corresponding data without data loss by using the byte length of the default MTU value of the data sending end.

The values of the bytes that are outside the byte length of the default MTU value of the data sending end from the first byte of the first detection packet may be set according to any rule, for example, all are set as 0 or the byte length value of the first detection packet, which are not limited in the present disclosure.

For example, FIG. 2 exemplarily illustrates the structure diagram of the first detection packet. As illustrated in FIG. 2, the byte length of the first detection packet is 80 bytes, and the default MTU value of the data sending end is 20 bytes, and then the content included in the first byte in the first detection packet is 80, and the content included in bytes 2-20 is the content X to be transmitted. The content included in bytes 21-80 is 0.

Embodiments of the present disclosure provide a method for detecting an MTU value. Please refer to FIG. 3, which illustrates a flowchart of the method for sending the first detection packet to the data receiving end at step S12 in FIG. 1.

At step S121, the first detection packet is sent to the data receiving end, and a timer is set.

The method for detecting the MTU value provided by the present disclosure further includes followings.

At step S15, if the second detection packet sent by the data receiving end is not received within a preset time period, a third detection packet is formed according to the first preset rule or a second preset rule, and sent to the data receiving end.

In the method for detecting the MTU value provided by the present disclosure, when the first detection packet is sent to the data receiving end, a timer may be set in order to determine whether the data receiving end receives the first detection packet. If the second detection packet sent by the data receiving end is not received within a preset time period, it indicates that the first detection packet sent by the data sending end may fail to be sent. For example, the detection packet is intercepted by the data sending end itself since its byte length is too long, or is not received by the data receiving end due to other interferences. The first detection packet may be formed according to the first preset rule or the second preset rule, and sent to the data receiving end again. That is, a third detection packet that is exactly the same as the first detection packet may be regenerated according to the first preset rule, and sent to the data receiving end again. It is also possible to generate a third detection packet different from the first detection packet according to the second preset rule, and send the third detection packet to the data receiving end again.

The timer may also be set again when it is resent to the data receiving end. If the second detection packet sent by the data receiving end is still not received within a preset time period, then the first detection packet sent by the data sending end may fail to be sent again. It is also possible to continue to form the Nth detection packet according to the first preset rule or the second preset rule, and continue to send the Nth detection packet to the data receiving end until the second detection packet sent by the data receiving end is received.

By setting the timer, it is possible to know in time whether the detection of the MTU value from the data sending end to the data receiving end is successful.

Embodiments of the present disclosure provide a method for detecting an MTU value. Please refer to FIG. 4, which illustrates a flowchart of a method for forming a third detection packet according to a second preset rule at step S15 in FIG. 2.

At step S151, a preset value is subtracted from the MTU value of the data sending end to obtain an adjusted MTU value.

At step S152, the third detection packet is formed based on the adjusted MTU value and sent to the data receiving end. In the third detection packet, within a byte length of the default MTU value of the data sending end from a first byte, the content included in a given byte is a byte length value of the third detection packet and the content included in the remaining bytes is the content to be transmitted.

In the method for detecting the MTU value provided by the present disclosure, if the data sending end does not receive the second detection packet sent by the data receiving end within a preset time period, considering that the first detection packet may fail to be sent to the data receiving end as its byte length is too large, a preset value may be subtracted from the MTU value of the data sending end to obtain an adjusted MTU value. For example, the MTU value of the data sending end is 80 bytes, and the preset value is 10 bytes, then the adjusted MTU value (i.e., 70 bytes) may be obtained by subtracting 10 bytes from the MTU value (i.e., 80 bytes) of the data sending end. Then, the third detection packet is formed based on the adjusted MTU value and sent to the data receiving end. In the third detection packet, within the byte length of the default MTU value of the data sending end from the first byte, the content included in the given byte is the byte length value of the third detection packet, and the content included in the remaining bytes is the content to be transmitted.

The structure of the third detection packet may refer to the structure of the first detection packet illustrated in FIG. 2, except that the byte length of the third detection packet is 10 bytes less than the byte length of the first detection packet. That is, the byte length of the third detection packet is 70 bytes, and the default MTU value of the data sending end is 20 bytes, and then the content included in the first byte of the third detection packet is 70, and the content included in bytes 2-20 is the content to be transmitted. The content included in bytes 21-70 is 0.

If the second detection packet is still not received, a re-adjusted MTU value may be obtained by continuing to subtract a preset value from the adjusted MTU value, and a fifth detection packet is then formed according to the second preset rule based on the re-adjusted value and sent to the data receiving end. And so on, until the second detection packet sent by the data receiving end is received.

Figure 5:
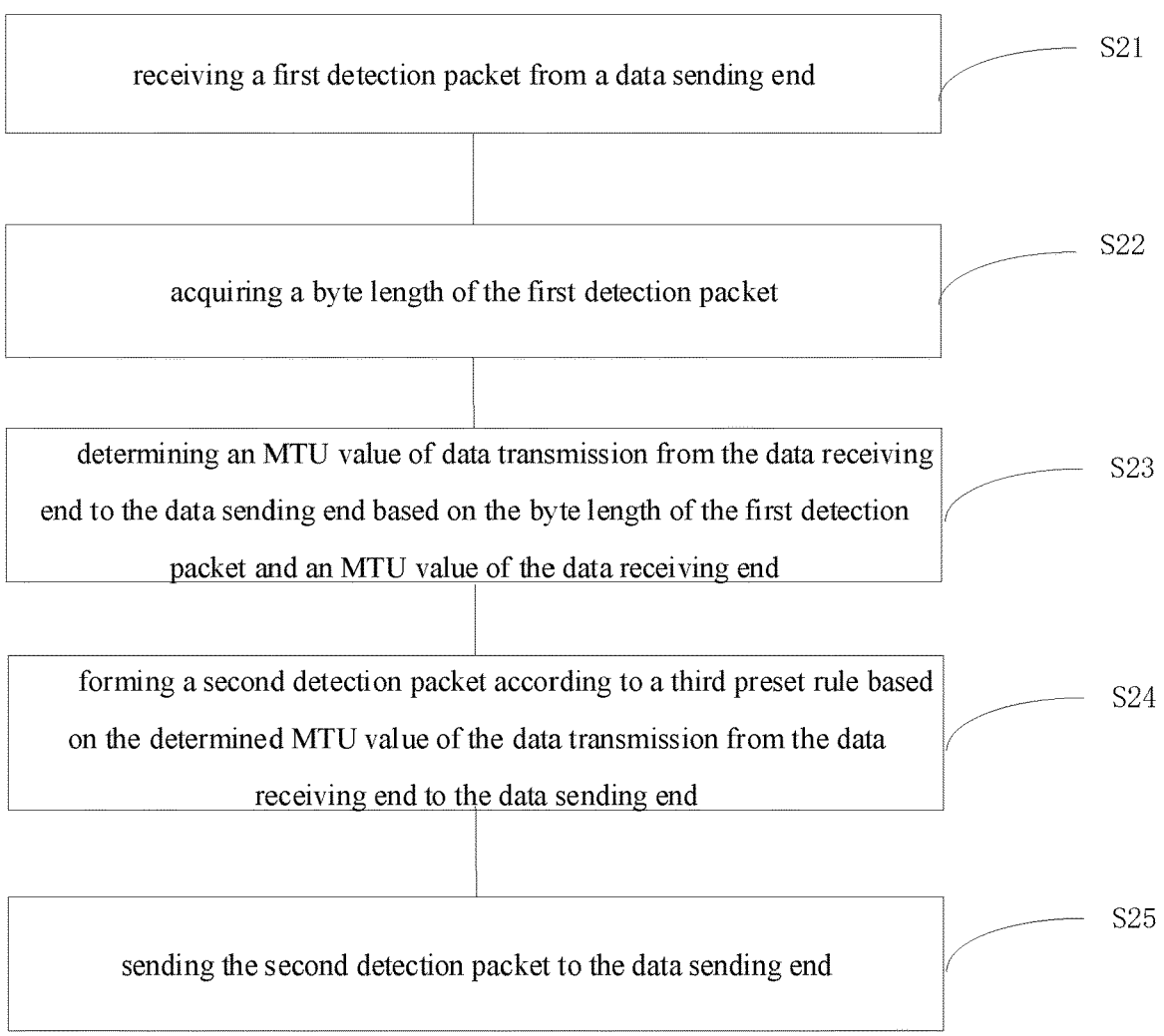
FIG. 5 is a flowchart of a method for detecting an MTU value illustrated according to an embodiment.

Embodiments of the present disclosure provide a method for detecting an MTU value. FIG. 5 is a flowchart of a method for detecting an MTU value according to an embodiment. The method for detecting the MTU value described in FIG. 5 is applied to a data receiving end or a data receiver. As illustrated in FIG. 5, the method for detecting the MTU value includes the following steps.

At step S21, a first detection packet from a data sending end is received.

At step S22, a byte length of the first detection packet is acquired.

At step S23, an MTU value of data transmission from the data receiving end to the data sending end is determined based on the byte length of the first detection packet and an MTU value of the data receiving end.

At step S24, a second detection packet is formed according to a third preset rule based on the determined MTU value of the data transmission from the data receiving end to the data sending end.

At step S25, the second detection packet is sent to the data sending end.

In the method for detecting the MTU value provided by the present disclosure, the first detection packet from the data sending end is received, and the byte length of the first detection packet is acquired, and the MTU value of data transmission from the data receiving end to the data sending end is then determined based on the byte length of the first detection packet and the MTU value of the data receiving end. Based on the determined MTU value of the data transmission from the data receiving end to the data sending end, the second detection packet is formed according to the third preset rule, and sent to the data sending end. In the method for detecting the MTU value provided by the present disclosure, the rule for forming the second detection packet may be the third preset rule or other rules, as long as the data sending end may recognize it.

In the method for detecting the MTU value provided by the present disclosure, the data receiving end also detects the MTU from the data receiving end to the data sending end while forming the second detection packet based on the result of the received first detection packet sent by the data sending end for the purpose of providing the detection result to the data sending end.

Figure 6:
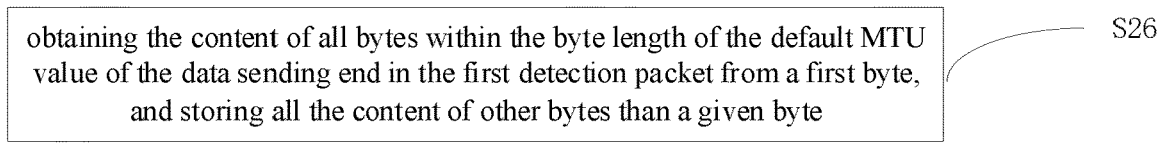
FIG. 6 is a flowchart of a method for detecting a maximum transmission unit MTU value illustrated according to an embodiment.

Embodiments of the present disclosure provide a method for detecting an MTU value. Please refer to FIG. 6, which is a flowchart of a method for detecting an MTU value according to an embodiment.

At step S26, content of all bytes within the byte length of the default MTU value of the data sending end in the first detection packet from the first byte is obtained, and all the content of other bytes than the given byte is stored.

When the first detection packet is formed at the data sending end, in order to increase the transmission rate to avoid the detection process of the MTU value occupying too much time or resources, and also to avoid data loss due to system compatibility issues, it makes full use of a byte space within the byte length of the default MTU value from the first byte. The byte length of the first detection packet is stored in the given byte within the byte length of the default MTU value from the first byte, and the other bytes store the content to be transmitted. Therefore, when the data receiving end receives the first detection packet, it extracts the content stored in bytes that are within the byte length of the default MTU value from the first byte of the first detection packet, and stores all the content in other bytes than the given byte.

Through such a setting, the detection of the MTU value between the data sending end and the data receiving end may be realized, and the sending opportunity of this detection packet may be also fully utilized for data transmission, which improves efficiency.

Embodiments of the present disclosure provide a method for detecting an MTU value. Please refer to FIG. 7, which illustrates a flowchart of a method for determining the MTU value of the data transmission from the data receiving end to the data sending end based on a byte length of the first detection packet and the MTU value of the data receiving end at step S23 in FIG. 5.

At step S231, a smaller value between the byte length of the first detection packet and the MTU value of the data receiving end is determined as the MTU value of the data transmission from the data receiving end to the data sending end.

In the method for detecting the MTU value provided by the present disclosure, the data receiving end obtains the byte length of the first detection packet after receiving the first detection packet. In order to avoid that the data packet to be sent cannot be formed according to the byte length of the first detection packet since the MTU value of the data receiving end is too large, the data receiving end compares the byte length of the first detection packet with its own MTU value and selects the smaller one as the MTU value of the data transmission from the data receiving end to the data sending end. In this way, the data sending end may be informed of the MTU value of the data receiving end. That is, the detection of the MTU value from the data receiving end to the data sending end may be realized.

Although the byte length of the first detection packet is stored in the given byte of the first detection packet, the data sending end may not be able to form the first detection packet based on the MTU value thereof due to the compatibility issues (for example, the compatibility with the Bluetooth protocol) when generating the first detection packet. Therefore, in order to accurately know the MTU value of the data sending end, the data receiving end may directly acquire the byte length of the first detection packet after receiving the first detection packet. For example, when the byte length of the first detection packet is 80 bytes and the MTU value of the data receiving end is 60 bytes, then the data sending end selects the smaller value therefrom as the MTU value between the data sending end and the data receiving end, and forms the second detection packet based on the MTU value between the data sending end and the data receiving end. Therefore, the MTU value of the data sending end included in the second detection packet is also the MTU value that the data sending end can use. Therefore, after receiving the second detection packet and obtains the MTU value of the data receiving end, the data sending end may directly use this MTU value as the MTU value for data transmission between the data sending end and the data receiving end.

Embodiments of the present disclosure provide a method for detecting an MTU value. Please refer to FIG. 8, which illustrates a flowchart of forming a second detection packet according to a third preset rule at step S24 in FIG. 5.

At step S241, the byte length of the second detection packet is the same as the content included in each byte of the second detection packet; or the content included in the given byte of the second detection packet is the byte length of the second detection packet.

In the method for detecting the MTU value provided by the present disclosure, the second detection packet is formed by the data receiving end according to the third preset rule. For example, the content included in each byte is the byte length of the second detection packet, or the content included in the given byte of the second detection packet is the byte length of the second detection packet. If the data sending end receives the second detection packet, the data sending end may obtain the content of any byte, and determine the byte length of the second detection packet (i.e., the MTU value of the data receiving end), or the data sending end may obtain the content of the given byte, and further determine the byte length of the second detection packet.

The method for detecting the MTU value provided by the present disclosure may be applied to any scenario, such as performing an OTA upgrade with Bluetooth BLE, or the transmission of log files after a network configuration failure.

FIG. 9 is an example of a method for detecting an MTU value illustrated according to an embodiment. In FIG. 9, the method for detecting the MTU value provided by the present disclosure includes the following steps.

At step S301, a data sending end forms a first detection packet according to a first preset rule based on its MTU value, for example, the MTU value of the data sending end is 80 bytes.

Taking the data transmission between two terminal devices with Bluetooth BLE as an example, the terminal device served as the data sending end has an MTU value of 80 bytes, and has a default MTU value of 20 bytes. In a byte length from the first byte to the 20th byte, the content included in the first byte is a byte length value of the first detection packet (that is, the MTU value of the terminal device as the data sending end), and the remaining bytes store the content to be sent. The content stored in bytes 21-80 is 0.

At step S302, the data sending end sends the first detection packet to the data receiving end.

At step S303, the data receiving end receives the first detection packet and acquires a byte length of the first detection packet.

At step S304, the data receiving end determines the MTU value of the data transmission from the data receiving end to the data sending end based on its MTU value (for example 60 bytes) and the byte length of the first detection packet.

The data receiving end compares its MTU value (for example 60 bytes) with the byte length of the first detection packet, and selects a smaller MTU value as the MTU value of the data transmission from the data receiving end to the data sending end. If the byte length of the first detection packet is the MTU value of the data sending end (for example 80 bytes), then the data receiving end selects 60 bytes as the MTU value of the data transmission from the data receiving end to the data sending end. The second detection packet is generated according to 60 bytes.

At step S305, a second detection packet is formed according to a third preset rule based on the determined MTU value.

The terminal device as the data receiving end may generate the second detection packet according to the third preset rule after determining the MTU value (60 bytes) for data transmission from the data receiving end to the data sending end. For example, the byte length of the second detection packet is the same as the content included in each byte of the second detection packet; or the content included in a given byte of the second detection packet is the byte length of the second detection packet.

At step S306, the second detection packet is sent to the terminal device as the data sending end.

At step S307, the MTU value included in the second detection packet is determined as the MTU value of the data transmission between the data sending end and the data receiving end.

After receiving the second detection packet, the terminal device as the data sending end acquires the byte length of the second detection packet (i.e., the MTU value of the terminal device as the data receiving end, which is 60 bytes). The MTU value of the terminal device as the data receiving end is taken as the MTU value of the data transmission between the terminal device as the data receiving end and the terminal device as the data sending end.

It is also possible to set a timer when the terminal device as the data sending end sends the first detection packet to the terminal device as the data receiving end at step S302. If the second detection packet sent by the terminal device as the data receiving end is not received within a preset time period, it indicates that the first detection packet sent by the terminal device as the data sending end may fail to be sent. The terminal device as the data sending end re-forms the first detection packet according to the first preset rule, and sends it to the terminal device as the data receiving end again, and detects the MTU value again until the second detection packet sent by the terminal device as the data receiving end is received.

The reason for sending failure may be that the first detection packet fails to be sent to the terminal device as the data receiving end since the first detection packet is intercepted by the data sending end itself due to too long byte length of the detection packet. Therefore, the first detection packet may be formed according to the second preset rule, and then sent to the terminal device as the data receiving end. That is, an adjusted MTU value (70 bytes) may be obtained by subtracting a preset value (such as 10 bytes) from the MTU value (80 bytes) of the terminal device as the data sending end, the third detection packet is then formed according to the first preset rule based on the adjusted MTU value (70 bytes) and sent to the terminal device as the data receiving end, and so on, until the second detection packet sent by the data receiving end may be received.

In an embodiment of the present disclosure, an apparatus for detecting an MTU value is provided. FIG. 10 is a block diagram of an apparatus for detecting an MTU value illustrated according to an embodiment. Referring to FIG. 10, the apparatus includes a first forming module 1001, a first sending module 1002, a first receiving module 1003, and a first determining module 1004.

The first forming module 1001 is configured to form a first detection packet according to a first preset rule based on an MTU value of the data sending end.

The first sending module 1002 is configured to send the first detection packet to a data receiving end.

The first receiving module 1003 is configured to receive a second detection packet from the data receiving end.

The first determining module 1004 is configured to determine an MTU value included in the second detection packet as an MTU value of data transmission between the data sending end and the data receiving end.

The first preset rule is as follows.

In the first detection packet, within a byte length of a default MTU value of the data sending end from a first byte, the content included in a given byte is a byte length value of the first detection packet and the content included in the remaining bytes is the content to be transmitted.

The first sending module 1002 is configured to send the first detection packet to the data receiving end and set a timer.

The first forming module 1001 is configured to form a third detection packet according to the first preset rule or a second preset rule and send the third detection packet to the data receiving end, if the second detection packet sent by the data receiving end is not received within a preset time period.

The first forming module 1001 is configured to:

subtract a preset value from the MTU value of the data sending end to obtain an adjusted MTU value; and form the third detection packet based on the adjusted MTU value and send the third detection packet to the data receiving end; wherein, in the third detection packet, within a byte length of the default MTU value of the data sending end from the first byte, the content included in a given byte is a byte length value of the third detection packet and the content included in the remaining bytes is the content to be transmitted.

Figure 11:
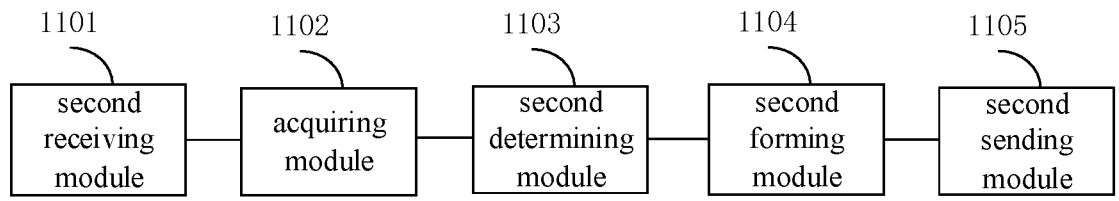
FIG. 11 is a block diagram of an apparatus for detecting an MTU value illustrated according to an embodiment.

In an embodiment of the present disclosure, an apparatus for detecting an MTU value is provided. FIG. 11 is a block diagram of an apparatus for detecting an MTU value according to an embodiment. Referring to FIG. 11, the apparatus includes a second receiving module 1101, an acquiring module 1102, a second determining module 1103, a second forming module 1104, and a second sending module 1105.

The second receiving module 1101 is configured to receive a first detection packet from a data sending end.

The acquiring module 1102 is configured to acquire a byte length of the first detection packet.

The second determining module 1103 is configured to determine an MTU value of data transmission from the data receiving end to the data sending end based on the byte length of the first detection packet and an MTU value of the data receiving end.

The second forming module 1104 is configured to form a second detection packet according to a third preset rule based on the determined MTU value of the data transmission from the data receiving end to the data sending end.

The second sending module 1105 is configured to send the second detection packet to the data sending end.

The acquiring module 1102 is configured to:

obtain the content of all bytes within the byte length of the default MTU value of the data sending end in the first detection packet from a first byte, and store all the content of other bytes than a given byte.

The second determining module 1103 is configured to:

determine a smaller value between the byte length of the first detection packet and the MTU value of the data receiving end as the MTU value of the data transmission from the data receiving end to the data sending end.

The third preset rule is as follows.

A byte length of the second detection packet is the same as the content included in each byte of the second detection packet.

Alternatively, the content included in the given byte of the second detection packet is the byte length of the second detection packet.

Regarding the apparatus in the foregoing embodiments, the specific manner in which each module performs the operation has been described in detail in the method embodiments, and detailed explanation will not be repeated here.

Figure 12:
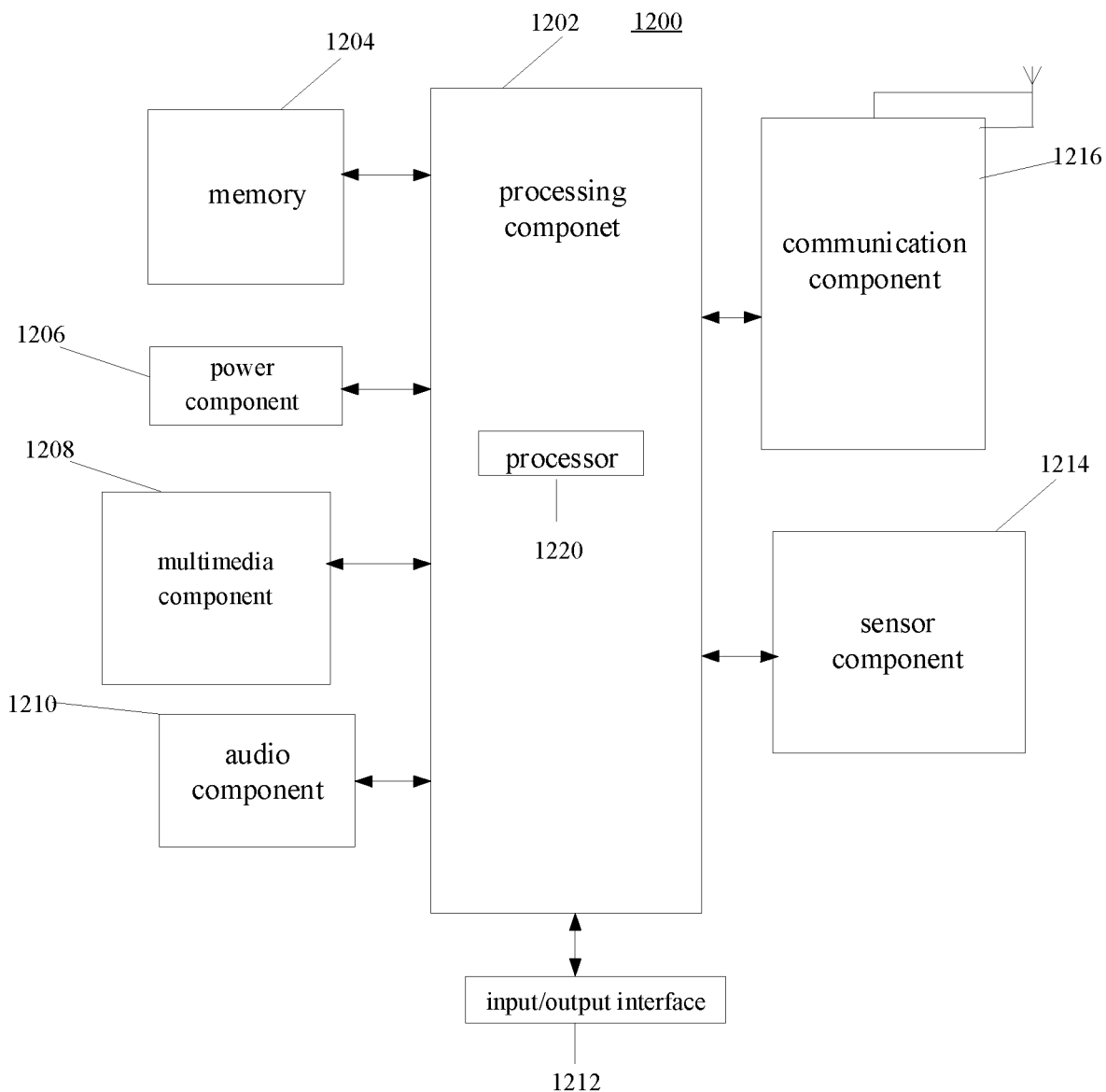
FIG. 12 is a block diagram of an apparatus for detecting an MTU value illustrated according to an embodiment (general structure of a mobile terminal).

FIG. 12 is a block diagram of an apparatus 1200 for detecting an MTU value illustrated according to an embodiment. For example, the apparatus 1200 may be a mobile phone, a computer, a digital broadcasting terminal, a messaging device, a game console, a tablet device, a medical device, a fitness device, a personal digital assistant, etc.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214 and a communication component 1216.

The processing component 1202 generally controls the overall operations of the apparatus 1200, such as the operations associated with display, telephone calls, data communications, camera operations, and recording operations. The processing component 1202 may include one or more processors 1220 to execute instructions to complete all or part of the steps of the aforementioned method. In addition, the processing component 1202 may include one or more modules to facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operation of the apparatus 1200. Examples of these data include instructions for any application or method operating on the apparatus 1200, contact data, phone book data, messages, pictures, videos, etc. The memory 1204 may be implemented by any type of volatile or non-volatile storage devices or their combination, such as a static random access memory (SRAM), an erasable Programmable read-only memory (EPROM), a programmable read-only memory (PROM), a read-only memory (ROM), a magnetic memory, a flash memory, a magnetic disk or an optical disk.

The power component 1206 provides power to various components of the apparatus 1200. The power component 1206 may include a power management system, one or more power supplies, and other components associated with generating, managing, and distributing power for the apparatus 1200.

The multimedia component 1208 includes a screen that provides an output interface between the apparatus 1200 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touching, sliding, and gestures on the touch panel. The touch sensor may not only sense the boundary of a touch or slide action, but also detect the duration and pressure related to the touch or slide operation. In some embodiments, the multimedia component 1208 includes a front camera and/or a rear camera. When the apparatus 1200 is in an operation mode, such as a shooting mode or a video mode, the front camera and/or the rear camera may receive external multimedia data. Each front camera and rear camera may be a fixed optical lens system or have focal length and optical zoom capabilities.

The audio component 1210 is configured to output and/or input audio signals. For example, the audio component 1210 includes a microphone (MIC). When the apparatus 1200 is in an operation mode, such as a call mode, a recording mode, and a voice recognition mode, the microphone is configured to receive external audio signals. The received audio signal may be further stored in the memory 1204 or transmitted via the communication component 1216. In some embodiments, the audio component 1210 further includes a speaker for outputting audio signals.

The I/O interface 1212 provides an interface between the processing component 1202 and a peripheral interface module. The peripheral interface module may be a keyboard, a click wheel, a button, and the like. These buttons may include but are not limited to: a home button, a volume button, a start button, and a lock button.

The sensor component 1214 includes one or more sensors for providing the apparatus 1200 with various aspects of status assessment. For example, the sensor component 1214 may detect the on/off status of the apparatus 1200 and the relative positioning of components. For example, the component is a display and a keypad of the apparatus 1200. The sensor component 1214 may also detect the position change of the apparatus 1200 or a component thereof. The presence or absence of a contact between the user and the apparatus 1200, the orientation or acceleration/deceleration of the apparatus 1200, and temperature change of the apparatus 1200. The sensor assembly 1214 may include a proximity sensor configured to detect the presence of nearby objects when there is no physical contact. The sensor component 1214 may also include a light sensor, such as a CMOS or CCD image sensor, for use in imaging applications. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the apparatus 1200 and other devices. The apparatus 1200 may access a wireless network based on a communication standard, such as WiFi, 2G, or 3G, or a combination thereof. In an embodiment, the communication component 1216 receives a broadcast signal or broadcast related information from an external broadcast management system via a broadcast channel. In an embodiment, the communication component 1216 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an embodiment, the apparatus 1200 may be implemented by one or more application specific integrated circuits (ASIC), digital signal processors (DSP), digital signal processing devices (DSPD), programmable logic devices (PLD), field programmable implemented by a gate array (FPGA), controllers, microcontrollers, microprocessors, or other electronic components, which are configured to implement the above voice control method.

In an embodiment, there is also provided a non-transitory computer-readable storage medium including instructions, such as the memory 1204 including instructions, which may be executed by the processor 1220 of the apparatus 1200 to complete the aforementioned method. For example, the non-transitory computer-readable storage medium may be a ROM, a random access memory (RAM), a CD-ROM, a magnetic tape, a floppy disk, an optical data storage device, etc.

A non-transitory computer-readable storage medium is provided. When instructions in the storage medium are executed by a processor of a mobile terminal, the mobile terminal is enabled to perform a method for detecting an MTU value. The method includes:
    forming a first detection packet according to a first preset rule based on an MTU value of the data sending end;
    sending the first detection packet to a data receiving end;
    receiving a second detection packet from the data receiving end; and
    determining an MTU value included in the second detection packet as an MTU value of data transmission between the data sending end and the data receiving end.

A non-transitory computer-readable storage medium is provided. When instructions in the storage medium are executed by a processor of a mobile terminal, the mobile terminal is enabled to perform a method for detecting an MTU value. The method includes:
    receiving a first detection packet from a data sending end;
    acquiring a byte length of the first detection packet;
    determining an MTU value of data transmission from the data receiving end to the data sending end based on the byte length of the first detection packet and an MTU value of the data receiving end;
    forming a second detection packet according to a third preset rule based on the determined MTU value of the data transmission from the data receiving end to the data sending end; and
    sending the second detection packet to the data sending end.

Those skilled in the art would readily envisage other embodiments of the present disclosure after considering the specification and practicing the present disclosure. This application is intended to cover any variations, usages, or adaptive changes of the present disclosure, which follow the general principles of the present disclosure and include common knowledge or conventional technical means in the art which are not disclosed in the present disclosure. The description and the embodiments are considered as exemplary only, with a true scope and spirit of the present disclosure being indicated by the following claims.

It should be understood that the present disclosure is not limited to the precise structure that has been described above and illustrated in the drawings, and various modifications and changes may be made without departing from its scope. The scope of the present disclosure is limited only by the appended claims.

What is claimed is:

1. A method for detecting a maximum transmission unit (MTU) value, the method comprising:
    forming, by a data sender, a first detection packet according to a first preset rule based on a default MTU value of the data sender, wherein the first detection packet is configured to indicate the default MTU value of the data sender, wherein the first preset rule comprises: the first detection packet comprises a first content and a second content, wherein the first content and the second content are included within a byte length of the default MTU value of the data sender from a first byte, the first content is included in a given byte of the first detection packet and indicates a byte length value of the first detection packet, and the second content is included in the remaining bytes and indicates content to be transmitted;
    sending, by the data sender, the first detection packet to a data receiver;
    receiving, by the data sender, a second detection packet from the data receiver, wherein the second detection packet comprises an MTU value, and the MTU value included in the second detection packet is a smaller value between the default MTU value of the data sender and an MTU value of the data receiver; and
    determining, by the data sender, the MTU value included in the second detection packet as an MTU value of data transmission between the data sender and the data receiver.

2. The method according to claim 1, wherein sending, by the data sender, the first detection packet to the data receiver comprises:
    sending the first detection packet to the data receiver and setting a timer;
    the method further comprises:
    in response to determining that the second detection packet sent by the data receiver is not received within a preset time period, forming a third detection packet according to the first preset rule or a second preset rule and sending the third detection packet to the data receiver.

3. The method according to claim 2, wherein forming the third detection packet according to the second preset rule comprises:

subtracting a preset value from the MTU value of the data sender to obtain an adjusted MTU value; and forming the third detection packet based on the adjusted MTU value and sending the third detection packet to the data receiver, wherein the third detection packet comprises a third content and a fourth content, the third content and the fourth content are included within a byte length of a default MTU value of the data sender from a first byte, the third content is included in a given byte of the third detection packet and indicates a byte length value of the third detection packet, and the fourth content is included in the remaining bytes and indicates content to be transmitted.

4. A method for detecting a maximum transmission unit (MTU) value, the method comprising:

receiving, by a data receiver, a first detection packet from a data sender, wherein the first detection packet is configured to indicate a default MTU value of the data sender, wherein the first detection packet comprises a first content and a second content, wherein the first content and the second content are included within a byte length of the default MTU value of the data sender from a first byte, the first content is included in a given byte of the first detection packet and indicates a byte length value of the first detection packet, and the second content is included in the remaining bytes and indicates content to be transmitted;

acquiring, by the data receiver, a byte length of the first detection packet;

determining, by the data receiver, an MTU value of data transmission from the data receiver to the data sender based on the byte length of the first detection packet and an MTU value of the data receiver, comprising: determining a smaller value between the byte length of the first detection packet and the MTU value of the data receiver as the MTU value of the data transmission from the data receiver to the data sender;

forming, by the data receiver, a second detection packet according to a third preset rule based on the determined MTU value of the data transmission from the data receiver to the data sender; and sending, by the data receiver, the second detection packet to the data sender.

5. The method according to claim 4, further comprising:

obtaining, by the data receiver, content of all bytes within a byte length of a default MTU value of the data sender in the first detection packet from a first byte, and storing all the content of other bytes than a given byte.

6. The method according to claim 4, wherein the third preset rule comprises:

content included in each byte of the second detection packet indicates a byte length of the second detection packet; or content included in a given byte of the second detection packet indicates the byte length of the second detection packet.

7. An apparatus for detecting a maximum transmission unit (MTU) value, comprising:

a processor; and a memory, configured to store instructions executable by the processor, wherein the processor is configured to run a program corresponding to the instructions stored in the memory causing the apparatus to perform acts comprising:

forming a first detection packet according to a first preset rule based on a default MTU value of a data sender, wherein the first detection packet is configured to indicate the default MTU value of the data sender, wherein the first preset rule comprises: the first detection packet comprises a first content and a second content, wherein the first content and the second content are included within a byte length of the default MTU value of the data sender from a first byte, the first content is included in a given byte of the first detection packet and indicates a byte length value of the first detection packet, and the second content is included in the remaining bytes and indicates content to be transmitted;

sending the first detection packet to a data receiver;

receiving a second detection packet from the data receiver, wherein the second detection packet comprises an MTU value, and the MTU value included in the second detection packet is a smaller value between the default MTU value of the data sender and an MTU value of the data receiver; and determining the MTU value included in the second detection packet as an MTU value of data transmission between the data sender and the data receiver.

8. The apparatus according to claim 7, wherein the first preset rule comprises:

the first detection packet comprises a first content and a second content, wherein the first content and the second content are included within a byte length of a default MTU value of the data sender from a first byte, the first content is included in a given byte of the first detection packet and indicates a byte length value of the first detection packet, and the second content is included in the remaining bytes and indicates content to be transmitted.

9. The apparatus according to claim 7, wherein sending the first detection packet to the data receiver comprises:

sending the first detection packet to the data receiver and setting a timer; and forming a third detection packet according to the first preset rule or a second preset rule and sending the third detection packet to the data receiver, in response to determining that the second detection packet sent by the data receiver is not received within a preset time period.

10. The apparatus according to claim 9, wherein forming the third detection packet according to the second preset rule comprises:

subtracting a preset value from the MTU value of the data sender to obtain an adjusted MTU value; and forming the third detection packet based on the adjusted MTU value and sending the third detection packet to the data receiver, wherein the third detection packet comprises a third content and a fourth content, the third content and the fourth content are included within a byte length of a default MTU value of the data sender from a first byte, the third content is included in a given byte of the third detection packet and indicates a byte length value of the third detection packet, and the fourth content is included in the remaining bytes and indicates content to be transmitted.

* * * * *